July 23, 1968     W. L. RENDESSY     3,393,923
TRAILER HITCH
Filed July 18, 1966     2 Sheets-Sheet 1
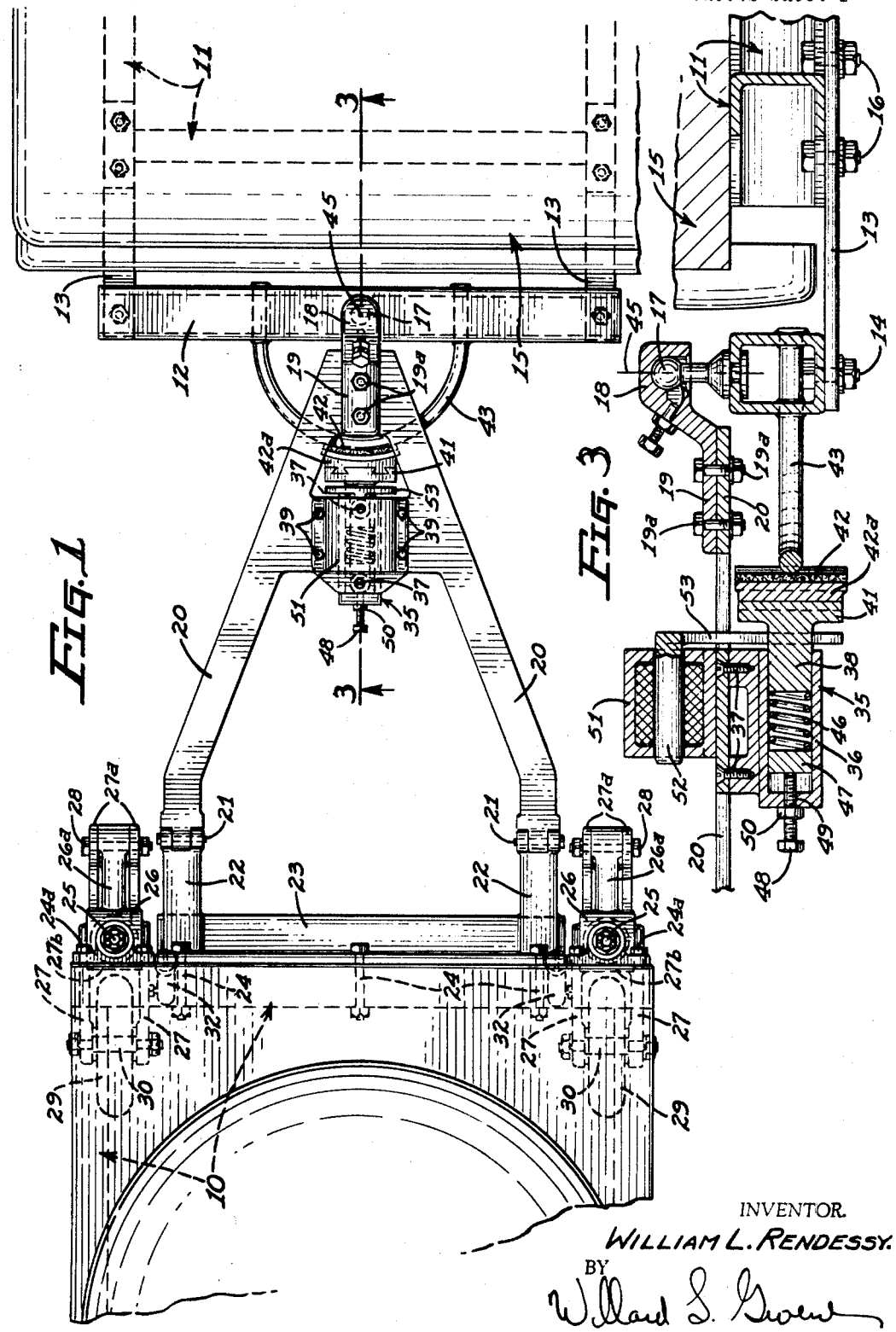
INVENTOR.
WILLIAM L. RENDESSY.
BY
ATTORNEY.

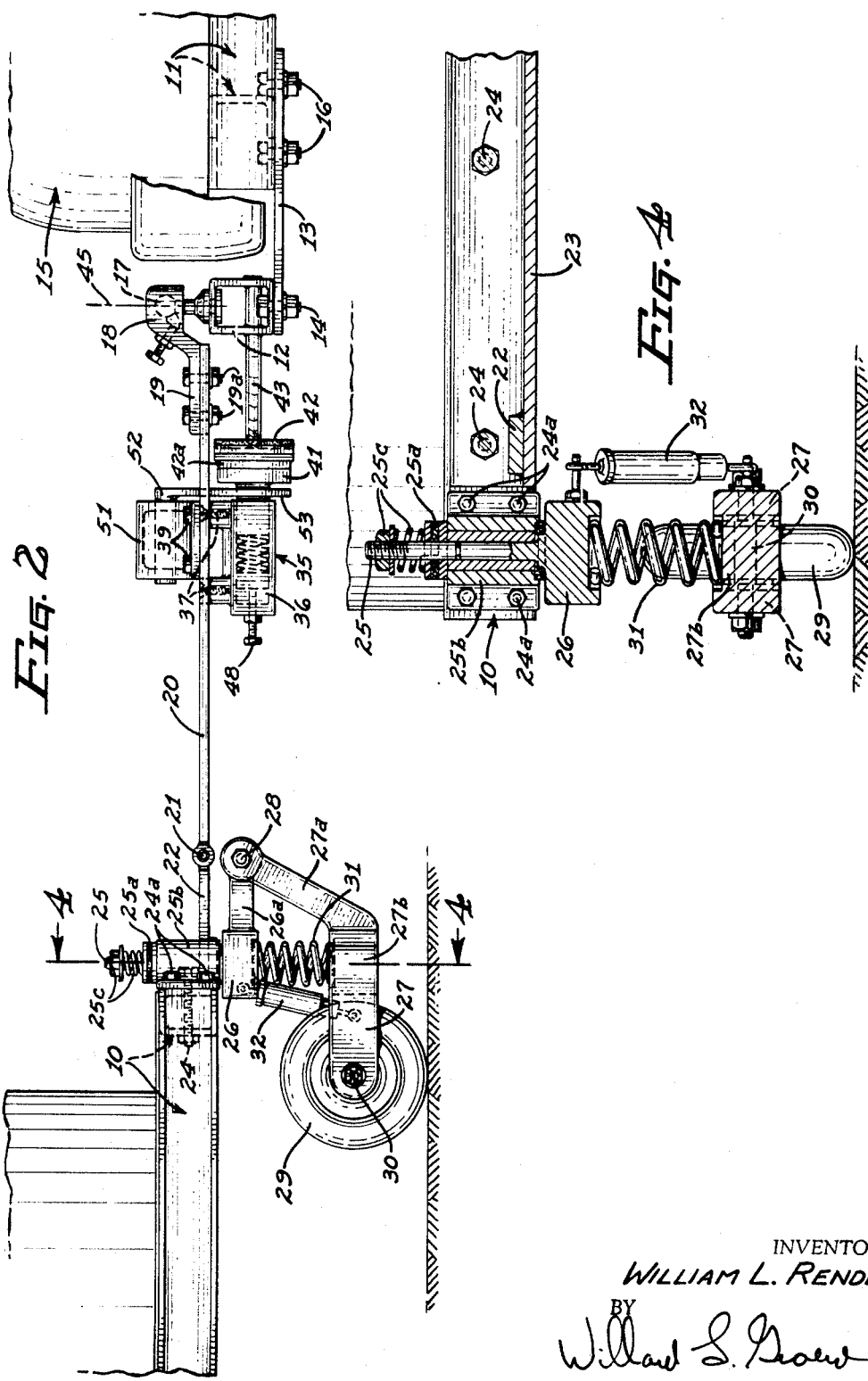

United States Patent Office 3,393,923
Patented July 23, 1968

3,393,923
TRAILER HITCH
William L. Rendessy, 1230 E. Mercer Lane,
Phoenix, Ariz. 85020
Filed July 18, 1966, Ser. No. 565,879
2 Claims. (Cl. 280—432)

ABSTRACT OF THE DISCLOSURE

A trailer hitch for a four-wheeled trailer having a pair of laterally spaced front casters having frictional pivotal restraint, and in which pivotally swinging movement about the ball hitch is intermittently restrained to prevent swaying and jackknifing in relationship to the braking of the towing vehicle to a stop and when going down steep hills.

This invention pertains to trailer hitches and more particularly to a jackknife free trailer hitch structure.

One of the objects of this invention is to provide a trailer hitch particularly adapted to a 4-wheel trailer which prevents sway and jackknifing during the operation of the towing vehicle under adverse conditions.

Another object of this invention is to provide a trailer hitch apparatus which automatically increases the frictional restraint of the pivotal connection when braking to a stop and when going down steep hills.

It is a further object of this invention to provide a trailer hitch particularly adapted to a 4-wheel trailer which operates with uniform frictional restrain for any relative angular position of the pivoting members of the trailer and towing vehicle.

Still another object of this invention is to provide a trailer hitch for a 4-wheel trailer or the like which is quiet and efficient in operation, yet is simple and sturdy for prolonged use under adverse conditions.

And a still further object is to provide a trailer hitch system including multiple caster wheels for the front end of a trailer and the pivotal sway and jackknife controlling elements all as a single unit adapted to be demountably connected to the trailer and the motor vehicle towing the trailer.

Further features and advantages of this invention will appear from a detailed description of the drawings in which:

FIG. 1 is a plan view of the apparatus incorporating the features of this invention.

FIG. 2 is a side elevation of a trailer hitch shown in FIG. 1.

FIG. 3 is an enlarged fragmentary sectional view on the line 3—3 of FIG. 1.

FIG. 4 is an enlarged fragmentary sectional view on the line 4—4 of FIG. 2.

As an example of one embodiment of this invention there is shown a trailer hitch for interconnecting a trailer frame 10 with a towing vehicle frame 11 comprising a transverse bar 12 demountably fixed to suitable extension brackets 13 by bolts 14, the forward ends of the brackets 13 being fixed to the frame 11 of the towing vehicle 15 by suitable bolts 16. Intermediate the ends of the transverse bar 12 is fixed an upstanding stationary hitching ball 17 adapted to receive the hitching ball socket 18 having its rearward shank 19 fixed to the forward joined ends of the hitching arms 20 by bolts 19a. The rear ends of the arms 20 are pivotally connected by suitable hinge pins 21 carried on the brackets 22 fixed to the transverse towing bar 23 which in turn is demountably secured to the trailer frame 10 by suitable bolts 24.

Pivotally mounted on suitable pivot shafts 25 are the integral pivot pieces 26 having forwardly projecting integral arms 26a, to the outer ends of which are pivotally mounted the upwardly extending bifurcated arms 27a on suitable pins 28. The arms 27a are integrally connected to the rearwardly projecting links 27 by a spring support pad 27b and the road contacting caster wheels 29 are journaled on shafts 30 which extend between the rear ends of the links 27.

Suitable compression spring means 31 and shock absorbers 32 are provided between the links 27 and the pivot pieces 26 to complete the suspension system for the road wheels 29.

Pivotally mounted on suitable pivot shafts 25 are the integral pivot pieces 26 to the lower ends of which are pivotally mounted the links 27 on suitable pins 28. Road contacting caster wheels 29 are journaled on stub shafts 30.

A suitable friction clutch 25a may be provided between the pivot shaft 25 and the bearing block 25b which is demountably secured to the trailer frame 10 by suitable bolts 24a to restrain wobble by regulating excessive freedom of pivotal movement of the caster wheels 29, suitable adjusting nut and spring means 25c being utilized to regulate the clutch 50.

A braking or pivotal restraining unit 35 is mounted on the joined area of arms 20 comprising a square tubular guide tube 36 rigidly fixed to the arms by suitable bolts 37. A brake shoe plate 41 is fixed to the outer end of the plunger 38 and has a brake shoe 42 of suitable material mounted on a suitable vertically disposal dovetail 42a thereon which contacts a braking ring 43 rigidly fixed to the transverse bar 12, the segmentally formed arcuate braking ring being substantially coaxial with the axis 45 of the trailer hitch pivot ball 17. Behind the brake shoe plunger 38 is a compression spring 46 which is backed up by the compression collar 47 carried on the end of the adjusting screw 48 threadedly mounted at 49 and locked in adjusted positions therein by the lock nut 50 so as to regulate the relative pressure of the brake shoe 42 against the periphery of the braking ring 43 and to restrain free pivotal movement of the trailer hitch arms 20 about the pivot axis 45 of the trailer hitch ball 17.

A solenoid coil 51 is fixed to the arms 20 by bolts 39 and has an armature 52 having a depending shifter fork 53 extending down behind brake shoe plate 41 so that when the solenoid coil 51 is energized the brake shoe 42 will be forced against the braking ring 43. The solenoid coil is arranged to be energized whenever the brakes are applied in slowing down and going down steep hills.

When the trailer is in normal forward motion the brake shoe 42 will be engaged with the periphery of the braking ring 43 causing a frictional restraint or drag against the free pivotal movement of the trailer about the trailer ball axis 45. When the brakes are applied on the towing vehicle causing the trailer to push forward and tend to jackknife or swing to one side, the solenoid 51 will be automatically energized to cause the brake shoe 42 to move more tightly up against the braking ring 43 causing a positive braking lock to prevent the trailer from jackknifing and swinging about the pivotal axis 45 thus, during normal driving, the spring 46 applies a limited moderate slipping frictional drag against the periphery of the braking ring 43 but when stopping, the brake shoe applies additional positive braking force against the braking ring to arrest all pivotal movement about the axis 45. Further, in the arrangement disclosed wherein a 4-wheel trailer having a pair of forward caster ground wheels 29 mounted thereon, the hinged connection in the hitch at the hinge pins 21 together with the ball joint arrangement at 17-18 permits universal sidewise relative swinging of the towing vehicle as well as up and down relative movement between the towing vehicle and the trailer for all types of road surface conditions.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. A trailer hitch for pivotally interconnecting the trailer with the towing vehicle comprising in combination:
  (a) a trailer frame,
  (b) a towing vehicle frame,
  (c) a transverse bar fixed on said towing vehicle frame,
  (d) a trailer hitch pivot ball fixed on said transverse bar,
  (e) hitching arms pivotally mounted on said trailer frame to swing around a transverse horizontal axis on said trailer frame,
  (f) a hitching ball socket fixed on said hitching arms arranged to receive said hitch pivot ball,
  (g) a braking ring fixed to said transverse bar,
  (h) a friction brake shoe arranged to engage said braking ring and movably mounted on said hitching arms for radial movement relative to said braking ring,
  (i) means on said hitching arms to yieldingly urge said brake shoe toward said braking ring.
  (j) and a solenoid actuated device for forcefully urging said brake shoe against said braking ring when said towing vehicle is braked.

2. In a trailer hitch as set forth in claim 1 wherein there is provided a pair of laterally spaced casters pivotally mounted on the front of said trailer frame including friction clutch means operable between said trailer frame and said casters to restrain the free swinging pivotal movement of said casters on said trailer frame.

References Cited

UNITED STATES PATENTS

| | | |
|---|---|---|
| 2,256,557 | 9/1941 | Gustin. |
| 2,440,502 | 4/1948 | Etgen _____ 280—476 X |
| 3,297,340 | 1/1967 | Rendessy _____ 280—432 |
| 3,318,617 | 5/1967 | Burns _____ 280—500 |

FOREIGN PATENTS

| | | |
|---|---|---|
| 517,003 | 2/1953 | Belgium. |
| 695,898 | 9/1940 | Germany. |

LEO FRIAGLIA, *Primary Examiner.*